United States Patent
Kao et al.

(10) Patent No.: US 9,482,329 B2
(45) Date of Patent: Nov. 1, 2016

(54) MULTI-MODE TRANSMISSION FOR VEHICLE POWERTRAIN SYSTEM

(71) Applicant: GM GLOBAL TECHNOLOGY OPERATIONS LLC, Detroit, MI (US)

(72) Inventors: Chi-Kuan Kao, Troy, MI (US); Chunhao J. Lee, Troy, MI (US); Kumaraswamy V. Hebbale, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 14/592,325

(22) Filed: Jan. 8, 2015

(65) Prior Publication Data

US 2016/0201780 A1 Jul. 14, 2016

(51) Int. Cl.
*F16H 31/00* (2006.01)
*F16H 37/02* (2006.01)
*F16H 1/46* (2006.01)
*F16H 9/10* (2006.01)

(52) U.S. Cl.
CPC .............. *F16H 37/022* (2013.01); *F16H 1/46* (2013.01); *F16H 9/10* (2013.01)

(58) Field of Classification Search
CPC ........... F16H 37/022; F16H 1/46; F16H 9/10
See application file for complete search history.

(56) References Cited

U.S. PATENT DOCUMENTS

| 5,884,535 A * | 3/1999 | Fukunaga | F16H 37/022 74/730.1 |
|---|---|---|---|
| 2006/0025263 A1 | 2/2006 | Sowul et al. | |
| 2006/0247086 A1* | 11/2006 | Watanabe | B60K 6/365 475/208 |
| 2010/0248895 A1* | 9/2010 | Jozaki | F16H 61/66259 477/44 |
| 2012/0143448 A1* | 6/2012 | Tohyama | F16H 61/12 701/51 |
| 2012/0322613 A1* | 12/2012 | Suzuki | F16H 61/16 477/41 |

* cited by examiner

*Primary Examiner* — David J Hlavka
(74) *Attorney, Agent, or Firm* — Quinn Law Group, PLLC

(57) ABSTRACT

A torque transmission device for a powertrain system includes a continuously variable unit (CVU) of a continuously variable transmission (CVT) arranged in parallel with a fixed-gear-ratio transmission. The fixed-gear-ratio transmission includes first and second planetary gear sets and a plurality of transmission clutches, wherein the first and second planetary gear sets are arranged to transfer torque between an input member and an output member in one of first and second fixed-gear-ratio modes by selectively activating the transmission clutches. The torque transmission device operates in a first fixed overdrive input/output speed ratio when the CVU input clutch is deactivated and a first set of two of the transmission clutches is activated. The torque transmission device operates in a second fixed overdrive input/output speed ratio when the CVU input clutch is deactivated and a second set of two of the transmission clutches is activated.

20 Claims, 11 Drawing Sheets

MULTI-MODE TRANSMISSION FOR VEHICLE POWERTRAIN SYSTEM

TECHNICAL FIELD

This disclosure relates to a transmission for a vehicle powertrain, and a method and control system associated therewith.

BACKGROUND

Powertrains having an internal combustion engine coupled to a continuously or infinitely variable transmission (CVT) may be employed to provide tractive effort in vehicles. A characteristic of a CVT includes the capability to continuously change a speed ratio between a minimum input speed/output speed (overdrive) ratio and a maximum input speed/output speed (underdrive) ratio, thus permitting selection of engine operating points that achieve peak efficiency, e.g., a mean-best torque point that is responsive to an operator torque request. As such, a continuously variable transmission is capable of steplessly changing through an infinite number of effective gear ratios over a range between a maximum gear ratio and a minimum gear ratio.

Known belt-type continuously variable transmissions include two pulleys, each having two sheaves. A continuous torque-transfer device, e.g., a belt runs between the two pulleys, with the two sheaves of each of the pulleys sandwiching the belt therebetween. Frictional engagement between the sheaves of each pulley and the belt couples the belt to each of the pulleys to transfer torque from one pulley to the other. One of the pulleys may function as a drive or input pulley so that the other pulley (an output or driven pulley) can be driven by the drive pulley via the belt. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

Known toroidal continuously variable transmissions include discs and roller mechanisms that transmit power between the discs. The toroidal continuously variable transmission includes at least one input disc rotatably coupled to a torque generator, e.g., an internal combustion engine, and at least one output disc rotatably coupled to the transmission output. The input disc and output disc define a cavity therebetween. The cavity defines a toroidal surface. The roller mechanism is placed within the cavity and is configured to vary the torque transmission ratio as the roller mechanism moves across the toroidal surface. A controlled tilt of the roller mechanism within the cavity changes the relative diameter of engagement of the input disc and output disc and incrementally changes the torque transmission ratio, providing for smooth, nearly instantaneous changes in torque transmission ratio.

SUMMARY

A torque transmission device for a powertrain system is described, and includes a continuously variable unit (CVU) of a continuously variable transmission (CVT) arranged in parallel with a fixed-gear-ratio transmission to transfer torque between a transmission input member and a transmission output member. The transmission input member selectively rotatably couples to an input member of the CVU by activating a CVU input clutch and the transmission output member rotatably couples to a CVU output member. The fixed-gear-ratio transmission includes first and second planetary gear sets and a plurality of transmission clutches, wherein the first and second planetary gear sets are arranged to transfer torque between the transmission input member and the transmission output member in one of first and second fixed-gear-ratio modes by selectively activating the transmission clutches. The first and second planetary gear sets each includes a plurality of meshingly engaged gear members including a ring gear, a plurality of planet gears coupled to a carrier and a sun gear, wherein each of the gear members is a node. The transmission input member rotatably couples to one of the nodes of one of the first planetary gear set and the second planetary gear set and the transmission output member rotatably couples to another of the nodes of one of the first planetary gear set and the second planetary gear set. The torque transmission device operates in a continuously variable mode when the CVU input clutch is activated. The torque transmission device operates in the first fixed-gear-ratio modes including a first fixed overdrive input/output speed ratio when the CVU input clutch is deactivated and a first set of two of the transmission clutches is activated. The torque transmission device operates in the second fixed-gear-ratio modes including a second fixed overdrive input/output speed ratio when the CVU input clutch is deactivated and a second set of two of the transmission clutches is activated.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
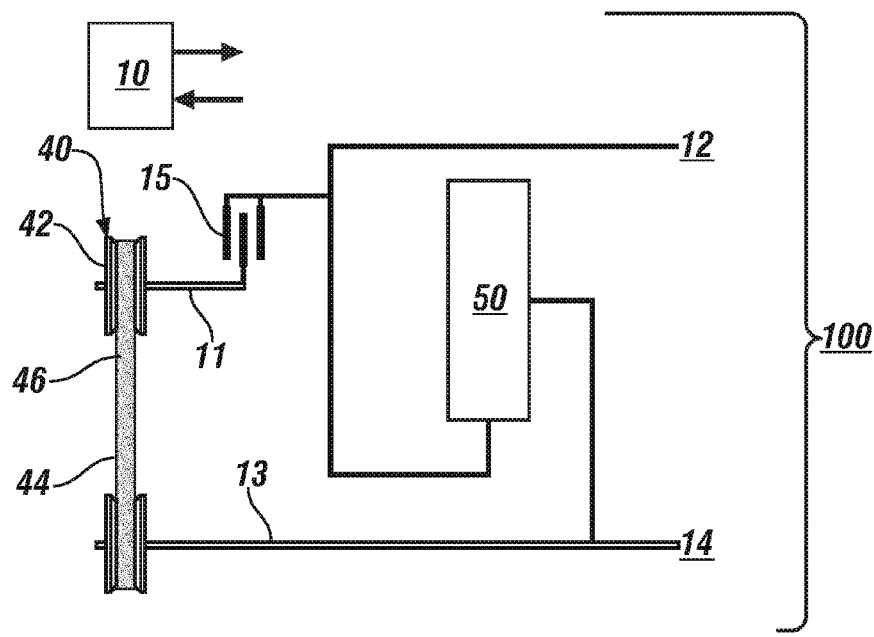
FIG. 1 schematically illustrates a multi-mode torque transmission device including a continuously variable unit (CVU) arranged to rotate in parallel with a fixed-gear-ratio transmission to transfer torque between an input member and an output member either a continuously variable state or a fixed-gear-ratio state, in accordance with the disclosure.

Referring now to the drawings, wherein the depictions are for the purpose of illustrating certain exemplary embodiments only and not for the purpose of limiting the same, FIG. 1 schematically illustrates elements of a powertrain system that includes a multi-mode transmission 100 employing a non-limiting embodiment of a continuously variable unit (CVU) 40 of a continuously or infinitely variable transmission (CVT) arranged to rotate in parallel with an embodiment of a fixed-gear-ratio transmission 50 to transfer mechanical power in the form of torque and rotating speed between a transmission input member 12 and a transmission output member 14. The CVU 40 may also be referred to as a variator. Operation of various controllable elements of the multi-mode transmission 100 is controlled by a controller 10. The fixed-gear-ratio transmission 50 is capable of transferring mechanical power in either of a first overdrive (OD) state and a second OD state. Each of the embodiments of the multi-mode transmission 100 described herein is 'multi-mode' in that it is capable of transferring torque between the input member 12 and the output member 14 in either a continuously variable mode through the CVU 40 or a fixed-gear-ratio mode through the fixed-gear-ratio transmission 50. In one embodiment, the input member 12 couples to a torque-generative device or prime mover such as an internal combustion engine or an electric machine. In one embodiment, the output member 14 couples to a driveline to transfer torque to tractive wheels. The controller 10 monitors operation and controls various actuators to effect operation in the continuously variable mode through the CVU 40 and effect operation in a fixed-gear-ratio mode in the fixed-gear-ratio transmission 50. Like numerals refer to like elements throughout the description.

The transmission input member 12 selectively rotatably couples to an input member 11 of the CVU 40 by activating a CVU input clutch 15. The transmission output member 14 rotatably couples to an output member 13 of the CVU 40. The fixed-gear-ratio transmission 50 preferably includes first and second planetary gear sets that are arranged to transfer torque between the transmission input member 12 and the transmission output member 14 by selectively activating a plurality of transmission clutches. The first and second planetary gear sets and transmission clutches are described with reference to FIGS. 2 through 21. As used herein, the term "selectively" is employed to describe any controller-controllable operating state, including activation and deactivation of one or a plurality of clutches and brakes. A "clutch" can be any selectively activatable and deactivatable torque transfer device that employs friction, mechanical interference or another suitable force to couple devices, including rotatably coupling coaxial devices. A "brake" is a form of a clutch that includes any selectively activatable and deactivatable torque transfer device that employs friction, mechanical interference or another suitable force to ground rotation of a rotatable device to a transmission case or other non-rotating element. Thus, the term "clutch" is employed herein to describe coupling two coaxial rotating devices and to describe coupling a rotating device to a non-rotating element.

As described herein, the torque transmission device 100 operates to transfer torque between the input member 12 and the output member 14 through the CVU 40 in a continuously variable mode when the CVU input clutch Ccvt 15 is activated. As described herein, the torque transmission device 100 operates to transfer torque between the input member 12 and the output member 14 through the fixed-gear-ratio transmission 50 in a first fixed-gear-ratio mode at a first fixed overdrive input/output speed ratio or in a second fixed-gear-ratio mode at a second fixed overdrive input/output speed ratio when the CVU input clutch Ccvt 15 is deactivated when other specific conditions described herein are met.

The CVU 40 as illustrated employs a belt-driven variator that includes a first pulley 42 rotatably coupled to a second pulley 44 via a belt 46. The first pulley 42 rotatably couples to the input member 11 and the second pulley 44 rotatably couples to the output member 13. Other elements of the CVU 40 and operation thereof are known and not described in detail herein. Alternatively, the CVU 40 may employ a toroidal variator, or another suitable variator configuration. Belt-driven variators and toroidal variators are known and not described in detail herein.

Controller 10 controls each embodiment of the powertrain system described herein. The controller 10 monitors sensor inputs and executes control routines to determine control parameters for actuators to control operation of various powertrain elements. Driver input devices such as an accelerator pedal and associated accelerator pedal position sensor can be monitored to determine an operator torque request. Various sensors are suitably positioned for sensing and providing signals, including, e.g., an input speed sensor monitoring rotation of the input member 12, variator speed sensor(s) monitoring the CVU 40 and an output speed sensor monitoring rotation of the output member 14. The input speed sensor and output speed sensor may be any suitable rotation position/speed sensing device, such as a Hall-effect sensor. The controller 10 may include digital processing capability that issues control signals based on input signals such as vehicle speed and engine torque. The controller 10 and similar terms control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds. Communications between controllers and between controllers, actuators and/or sensors may be accomplished using a direct wired link, a networked communications bus link, a wireless link or any another suitable communications link.

Each of the embodiments of the fixed-gear-ratio transmission described herein with reference to FIGS. 2 through 21 include first and second planetary gear sets arranged to transfer torque between the transmission input member 12 and the transmission output member 14 by selectively activating a plurality of transmission clutches and/or transmission brakes. Each of the embodiments of the first and second planetary gear sets is preferably a simple differential gearset that includes a plurality of meshingly engaged gear members including a ring gear, and a plurality of planet gears coupled to a carrier and a sun gear. Each of the aforementioned gear members (ring gear, carrier, and sun gear) is also referred to herein as a node. Furthermore, the transmission input member 12 rotatably couples to one of the nodes of the first planetary gear set and/or one of the nodes of the second planetary gear set, and the transmission output member 14 rotatably couples to another of the nodes of the first or the second planetary gear set. The multi-mode transmission 100 transfers torque in a continuously variable mode when the CVU input clutch 15 and a single one of a plurality of transmission clutches are activated. The multi-mode transmission 100 transfers mechanical power in the form of torque and rotational speed between the transmission input member 12 and the transmission output member 14 in a first fixed-gear-ratio mode when the CVU input clutch 15 is deactivated and a first set of two of transmission clutches is activated. The multi-mode transmission 100 transfers mechanical power in the form of torque and rotational speed between the input member 12 and the output member 14 in a second, different fixed-gear-ratio mode when the CVU input clutch 15 is deactivated and a second set of two of the transmission clutches is activated. The first and second sets of the activated transmission clutches are identified for each of the embodiments of the fixed-gear-ratio transmission described with reference to FIGS. 2-21. Furthermore, one of the nodes of the first planetary gear set rotatably couples to one of the nodes of the second planetary gear when the multi-mode transmission 100 is operating at the first fixed overdrive input/output speed ratio and when the multi-mode transmission 100 is operating at the second fixed overdrive input/output speed ratio. Operation in a reverse mode is achieved in a fixed input/output speed ratio when the CVU input clutch is deactivated and a third set of two of the transmission clutches is activated, as described herein.

Figure 2:
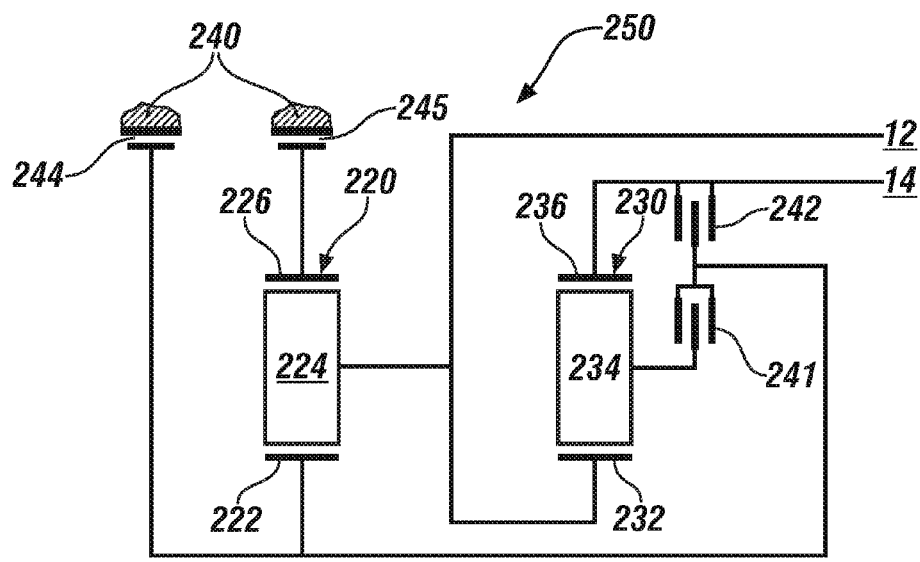
FIGS. 2-21 schematically illustrate embodiments of fixed-gear-ratio transmissions arranged to rotate in parallel with an embodiment of CVU described with reference to FIG. 1, in accordance with the disclosure.

FIG. 2 schematically illustrates a first embodiment of the fixed-gear-ratio transmission 250 that is capable of transferring mechanical power in either of a first overdrive (OD) state and a second OD state between the transmission input member 12 and the transmission output member 14. In this embodiment, the fixed-gear-ratio transmission 250 includes a first planetary gear set 220 and a second planetary gear set 230. The first and second planetary gear sets 220, 230 are simple planetary gear sets. The first planetary gear set 220 includes a first sun gear 222, a first carrier 224 and a first ring gear 226, and the second planetary gear set 230 includes a second sun gear 232, a second carrier 234 and a second ring gear 236. The first sun gear 222 selectively grounds to a transmission case 240 by activating a first brake B1 244 and selectively couples to the second carrier 234 by activating a first clutch C1 241 and selectively couples to the output member 14 by activating a second clutch C2 242. The first carrier 224 couples to the input member 12 and the second sun gear 232. The first ring gear 226 selectively couples to the transmission case 240 by activating a second brake B2 245. A second ring gear 236 couples to the output member 14. In an embodiment of the multi-mode transmission 100 employing the first fixed-gear-ratio transmission 250, a clutch activation chart and corresponding gear ratios associated with operation thereof is shown in Table 1. The stated gear ratios associated with operation of the CVU 40 include a maximum CVU underdrive ratio and a minimum CVU overdrive ratio. Table 1 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 1

|  | Ratios | B1 | B2 | C1 | C2 | Ccvt |
| --- | --- | --- | --- | --- | --- | --- |
| Reverse | −1.8 | X |  | X |  |  |
| Neutral | 0 |  |  |  |  |  |
| CVTUD | 2.38 |  | X |  |  | X |
| CVTOD | 0.42 |  | X |  |  | X |
| OD1 | 0.42 |  | X |  | X |  |
| OD2 | 0.31 |  | X | X |  |  |

Figure 3:
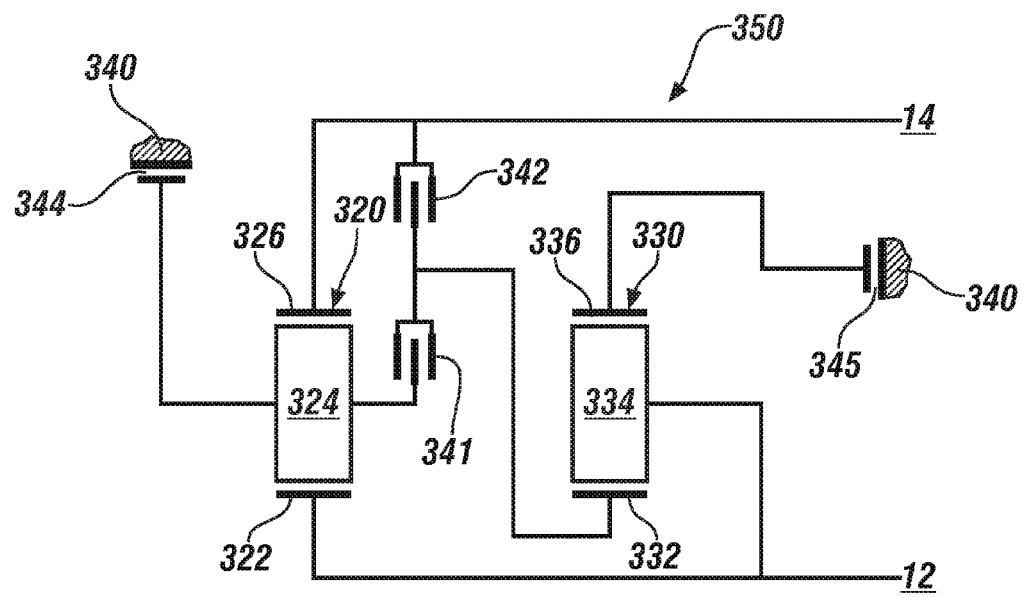

FIG. 3 schematically illustrates a second embodiment of the fixed-gear-ratio transmission 350 that is capable of transferring mechanical power in either of a first overdrive (OD) state and a second OD state between the transmission input member 12 and the transmission output member 14. In this embodiment, the fixed-gear-ratio transmission 350 includes a first planetary gear set 320 and a second planetary gear set 330. The first and second planetary gear sets 320, 330 are simple planetary gear sets. The first planetary gear set 320 includes a first sun gear 322, a first carrier 324 and a first ring gear 326, and the second planetary gear set 330 includes a second sun gear 332, a second carrier 334 and a second ring gear 336. The first sun gear 322 couples to the input member 12. The first carrier 324 selectively grounds to a transmission case 340 by activating a first brake B1 344, selectively couples to the second sun gear 332 by activating a first clutch C1 341, and selectively couples to the output member 14 by activating the first clutch C1 341 and a second clutch C2 342. The first ring gear 326 couples to the output member 14 and selectively couples to the second sun gear 332 by activating the second clutch C2 342. The second carrier 334 couples to the input member 12. The second ring gear 336 selectively grounds to the transmission case 340 by activating a second brake B2 345. In an embodiment of the multi-mode transmission 100 employing the second fixed-gear-ratio transmission 350, a clutch activation chart and corresponding gear ratios associated with operation thereof is shown in Table 2. The stated gear ratios associated with operation of the CVU 40 include a maximum CVU underdrive ratio and a minimum CVU overdrive ratio. Table 2 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 2

|  | Ratios | B1 | B2 | C1 | C2 | Ccvt |
| --- | --- | --- | --- | --- | --- | --- |
| Reverse | −1.8 | X |  | X |  |  |
| Neutral | 0 |  |  |  |  |  |
| CVTUD | 2.38 |  | X |  |  | X |
| CVTOD | 0.42 |  | X |  |  | X |
| OD1 | 0.42 |  | X |  | X |  |
| OD2 | 0.31 |  | X | X |  |  |

Figure 4:
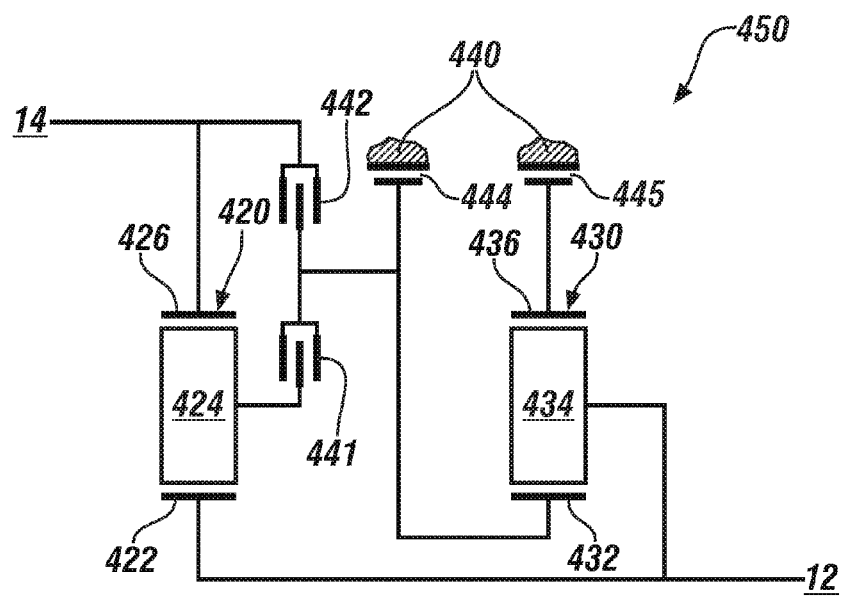

FIG. 4 schematically illustrates a third embodiment of the fixed-gear-ratio transmission 450 that is capable of transferring mechanical power in either of a first overdrive (OD) state and a second OD state between the transmission input member 12 and the transmission output member 14. In this embodiment, the fixed-gear-ratio transmission 450 includes a first planetary gear set 420 and a second planetary gear set 430. The first and second planetary gear sets 420, 430 are simple planetary gear sets. The first planetary gear set 420 includes a first sun gear 422, a first carrier 424 and a first ring gear 426, and the second planetary gear set 430 includes a second sun gear 432, a second carrier 434 and a second ring gear 436. The first sun gear 422 couples to the input member 12. The first carrier 424 selectively couples to the second sun gear 432 of the second planetary gear set 430 by activating the first clutch C1 441, selectively grounds to the transmission case 440 by activating a first brake B1 444 and the first clutch C1 441, and selectively couples to the output member 14 and the first ring gear 426 by activating the first clutch C1 441 and second clutch C2 442. The first ring gear 426 couples to the output member 14. The second carrier 434 couples to the input member 12 and the second ring gear 436 selectively grounds to the transmission case 440 by activating second brake 445. In an embodiment of the multi-mode transmission 100 employing the third fixed-gear-ratio transmission 450, a clutch activation chart and corresponding gear ratios associated with operation thereof is shown in Table 3. The stated gear ratios associated with operation of the CVU 40 include a maximum CVU underdrive ratio and a minimum CVU overdrive ratio. Table 3 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 3

|  | Ratios | B1 | B2 | C1 | C2 | Ccvt |
|---|---|---|---|---|---|---|
| Reverse | −1.8 | X |  | X |  |  |
| Neutral | 0 |  |  |  |  |  |
| CVTUD | 2.38 |  | X |  |  | X |
| CVTOD | 0.42 |  | X |  |  | X |
| OD1 | 0.42 |  | X | X |  |  |
| OD2 | 0.31 |  | X |  | X |  |

Figure 5:
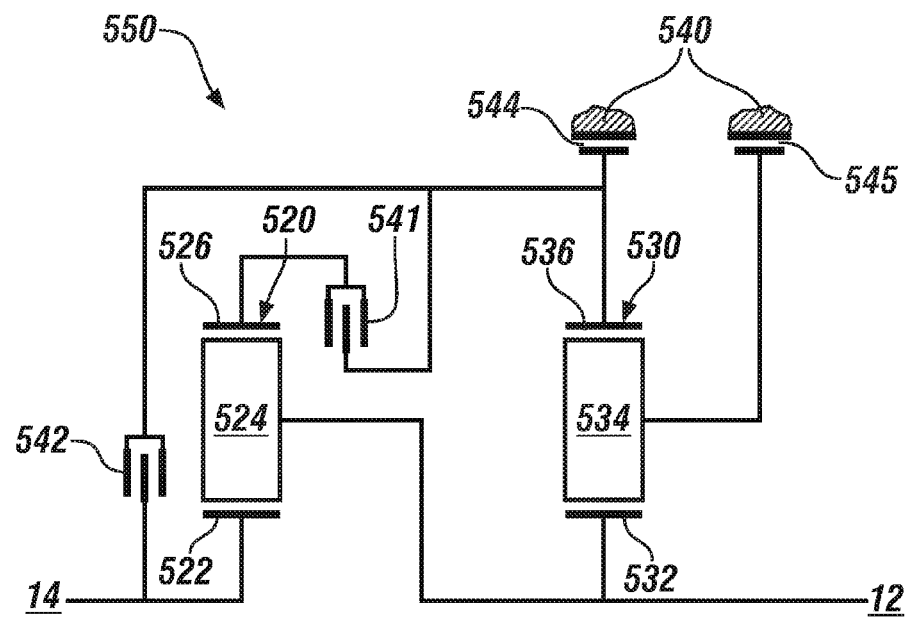

FIG. 5 schematically illustrates a fourth embodiment of the fixed-gear-ratio transmission 550 that is capable of transferring mechanical power in either of a first overdrive (OD) state and a second OD state between the transmission input member 12 and the transmission output member 14. In this embodiment, the fixed-gear-ratio transmission 550 includes a first planetary gear set 520 and a second planetary gear set 530. The first and second planetary gear sets 520, 530 are simple planetary gear sets. The first planetary gear set 520 includes a first sun gear 522, a first carrier 524 and a first ring gear 526, and the second planetary gear set 530 includes a second sun gear 532, a second carrier 534 and a second ring gear 536. The first sun gear 522 couples to the output member 14, selectively couples to the second ring gear 536 by activating a second clutch 542, and selectively grounds to a transmission case 540 by activating a first brake B1 544 and second clutch 542. The first carrier 524 couples to the input member 12 and the second sun gear 532. The first ring gear 526 selectively couples to the transmission case 540 by activating a first clutch 541 and a first brake B1 544, and selectively couples to the transmission output 14 by activating the first clutch 541 and the second clutch 542. The second carrier 534 selectively grounds to the transmission case 540 by activating a second brake 545. The second ring gear 536 selectively grounds to the transmission case 540 by activating first brake 544. In an embodiment of the multi-mode transmission 100 employing the fourth fixed-gear-ratio transmission 550, a clutch activation chart and corresponding gear ratios associated with operation thereof is shown in Table 4. The stated gear ratios associated with operation of the CVU 40 include a maximum CVU underdrive ratio and a minimum CVU overdrive ratio. Table 4 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 4

|  | Ratios | B1 | B2 | C1 | C2 | Ccvt |
|---|---|---|---|---|---|---|
| Reverse | −1.8 |  | X |  | X |  |
| Neutral | 0 |  |  |  |  |  |
| CVTUD | 2.38 | X |  |  |  | X |
| CVTOD | 0.42 | X |  |  |  | X |
| OD1 | 0.42 | X |  | X |  |  |
| OD2 | 0.31 |  | X |  | X |  |

Figure 6:
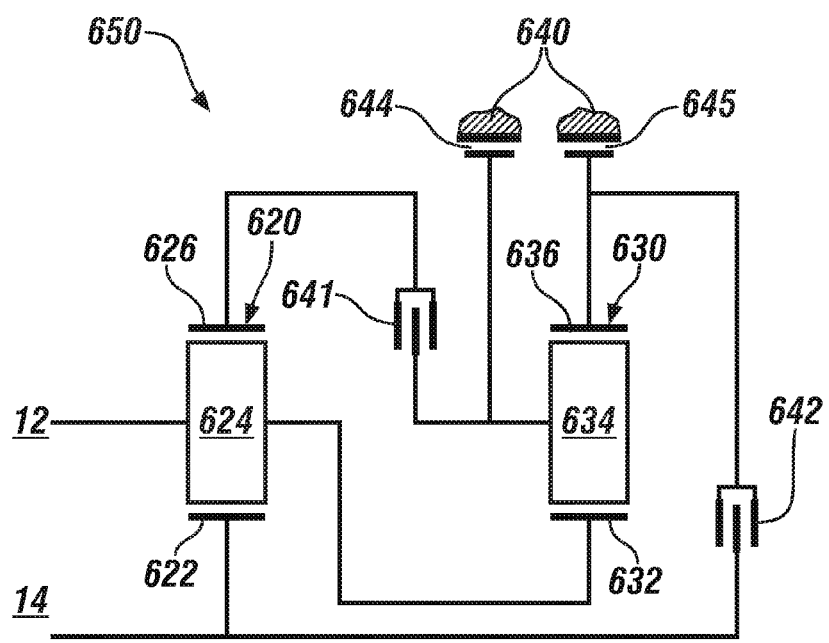

FIG. 6 schematically illustrates a fifth embodiment of the fixed-gear-ratio transmission 650 that is capable of transferring mechanical power in either of a first overdrive (OD) state and a second OD state between the transmission input member 12 and the transmission output member 14. In this embodiment, the fixed-gear-ratio transmission 650 includes a first planetary gear set 620 and a second planetary gear set 630. The first and second planetary gear sets 620, 630 are simple planetary gear sets. The first planetary gear set 620 includes a first sun gear 622, a first carrier 624 and a first ring gear 626, and the second planetary gear set 630 includes a second sun gear 632, a second carrier 634 and a second ring gear 636. The first sun gear 622 couples to the output member 14. The first carrier 624 couples to the input member 12 and the second sun gear 632. The first ring gear 626 selectively couples to the second carrier 634 by activating a first clutch C1 641 and further selectively couples to the transmission case 640 by activating a first brake B1 644. The second ring gear 636 selectively couples the output member 14 by activating a second clutch 642 and selectively grounds to the transmission case 640 by activating a second brake 645. In an embodiment of the multi-mode transmission 100 employing the fifth fixed-gear-ratio transmission 650, a clutch activation chart and corresponding gear ratios associated with operation thereof is shown in Table 5. The stated gear ratios associated with operation of the CVU 40 include a maximum CVU underdrive ratio and a minimum CVU overdrive ratio. Table 5 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 5

|  | Ratios | B1 | B2 | C1 | C2 | Ccvt |
|---|---|---|---|---|---|---|
| Reverse | −1.8 | X |  |  | X |  |
| Neutral | 0 |  |  |  |  |  |
| CVTUD | 2.17 |  | X |  |  | X |
| CVTOD | 0.46 |  | X |  |  | X |
| OD1 | 0.46 |  | X | X |  |  |
| OD2 | 0.36 | X |  |  | X |  |

Figure 7:
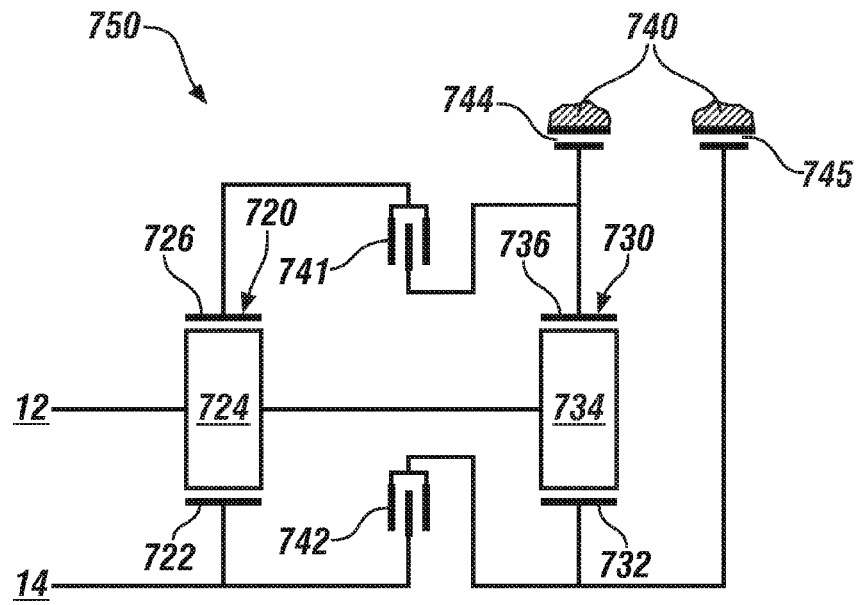

FIG. 7 schematically illustrates a sixth embodiment of the fixed-gear-ratio transmission 750 that is capable of transferring mechanical power in either of a first overdrive (OD) state and a second OD state between the transmission input member 12 and the transmission output member 14. In this embodiment, the fixed-gear-ratio transmission 750 includes a first planetary gear set 720 and a second planetary gear set 730. The first and second planetary gear sets 720, 730 are simple planetary gear sets. The first planetary gear set 720 includes a first sun gear 722, a first carrier 724 and a first ring gear 726, and the second planetary gear set 730 includes a second sun gear 732, a second carrier 734 and a second ring gear 736. The first sun gear 722 couples to the output member 14, the first carrier 724 couples to the input member 12 and to the second carrier 734, and the first ring gear 726 selectively grounds to the transmission case 740 by activating a first clutch C1 741 and a first brake B1 744. The second sun gear 732 selectively couples to the first sun gear 722 by activating a second clutch C2 742 and selectively grounds to the transmission case 740 by activating a second brake B2 745. The second ring gear 736 selectively grounds to the transmission case by activating the first brake B1 744. In an embodiment of the multi-mode transmission 100 employing the sixth fixed-gear-ratio transmission 750, a clutch activation chart and corresponding gear ratios associated with operation thereof is shown in Table 6. The stated gear ratios associated with operation of the CVU 40 include a maximum CVU underdrive ratio and a minimum CVU overdrive ratio. Table 6 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 6

|  | Ratios | B1 | B2 | C1 | C2 | Ccvt |
|---|---|---|---|---|---|---|
| Reverse | −1.75 |  | X | X |  |  |
| Neutral | 0 |  |  |  |  |  |
| CVTUD | 2.38 | X |  |  |  | X |
| CVTOD | 0.42 | X |  |  |  | X |
| OD1 | 0.42 | X |  |  | X |  |
| OD2 | 0.31 | X |  | X |  |  |

Figure 8:
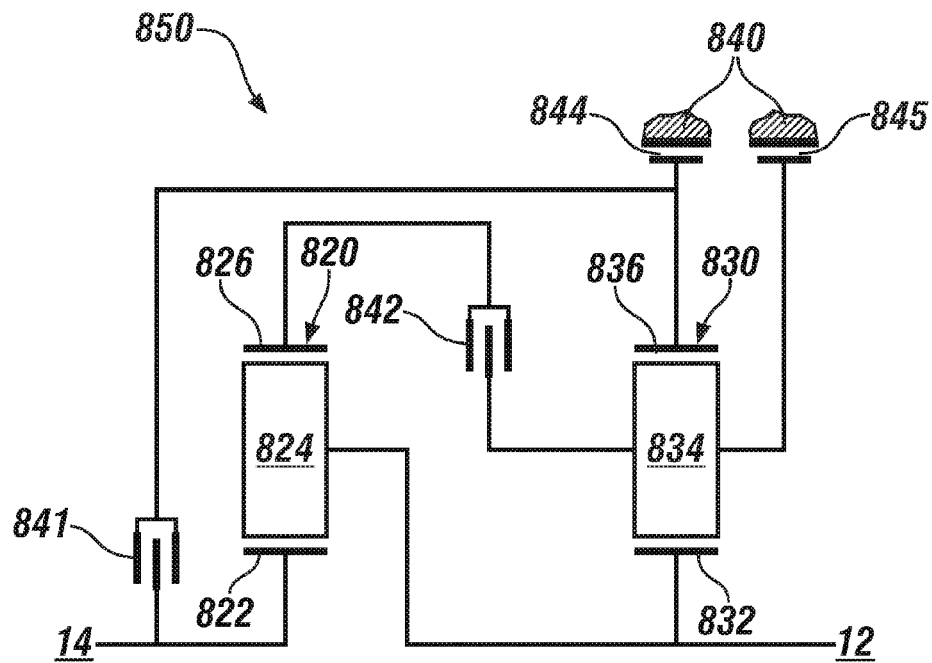

FIG. 8 schematically illustrates a seventh embodiment of the fixed-gear-ratio transmission 850 that is capable of transferring mechanical power in either of a first overdrive (OD) state and a second OD state between the transmission input member 12 and the transmission output member 14. In this embodiment, the fixed-gear-ratio transmission 850 includes a first planetary gear set 820 and a second planetary gear set 830. The first and second planetary gear sets 820, 830 are simple planetary gear sets. The first planetary gear set 820 includes a first sun gear 822, a first carrier 824 and a first ring gear 826, and the second planetary gear set 830 includes a second sun gear 832, a second carrier 834 and a second ring gear 836. The first sun gear 822 couples to the output member 14. The first carrier 824 couples to the input member 12 and the second sun gear 832. The first ring gear 826 selectively couples to the second carrier 834 by activating a second clutch C2 842. The second carrier 834 selectively grounds to a transmission case 840 by activating a second brake B2 845. The second ring gear 836 selectively couples to the output member 14 by activating a first clutch C1 841 and selectively grounds to the transmission case 840 by activating a first brake B1 844. In an embodiment of the multi-mode transmission 100 employing the seventh fixed-gear-ratio transmission 850, a clutch activation chart and corresponding gear ratios associated with operation thereof is shown in Table 7. The stated gear ratios associated with operation of the CVU 40 include a maximum CVU underdrive ratio and a minimum CVU overdrive ratio. Table 7 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 7

|  | Ratios | B1 | B2 | C1 | C2 | Ccvt |
|---|---|---|---|---|---|---|
| Reverse | −1.8 |  | X | X |  |  |
| Neutral | 0 |  |  |  |  |  |
| CVTUD | 2.17 | X |  |  |  | X |
| CVTOD | 0.46 | X |  |  |  | X |
| OD1 | 0.46 | X |  |  | X |  |
| OD2 | 0.36 |  | X |  | X |  |

Figure 9:
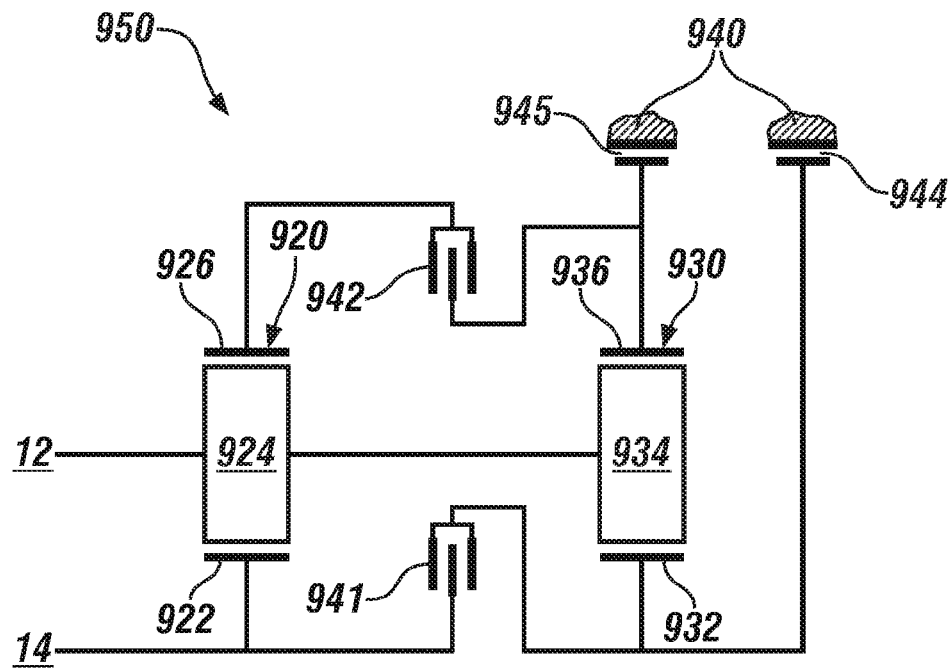

FIG. 9 schematically illustrates a eighth embodiment of the fixed-gear-ratio transmission 950 that is capable of transferring mechanical power in either of a first overdrive (OD) state and a second OD state between the transmission input member 12 and the transmission output member 14. In this embodiment, the fixed-gear-ratio transmission 950 includes a first planetary gear set 920 and a second planetary gear set 930. The first and second planetary gear sets 920, 930 are simple planetary gear sets. The first planetary gear set 920 includes a first sun gear 922, a first carrier 924 and a first ring gear 926, and the second planetary gear set 930 includes a second sun gear 932, a second carrier 934 and a second ring gear 936. The first sun gear 922 couples to the output member 14, the first carrier 924 couples to the input member 12 and to the second carrier 934, and the first ring gear 926 selectively couples to the transmission case 940 by activating a second clutch C2 942 and a second brake B2 945. The second sun gear 932 selectively couples to the first sun gear 922 by activating a first clutch C1 941 and selectively grounds to the transmission case 940 by activating a first brake B1 944. The second ring gear 936 selectively grounds to the transmission case by activating the second brake B2 945. In an embodiment of the multi-mode transmission 100 employing the eighth fixed-gear-ratio transmission 950, a clutch activation chart and corresponding gear ratios associated with operation thereof is shown in Table 8. The stated gear ratios associated with operation of the CVU 40 include a maximum CVU underdrive ratio and a minimum CVU overdrive ratio. Table 8 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 8

|  | Ratios | B1 | B2 | C1 | C2 | Ccvt |
|---|---|---|---|---|---|---|
| Reverse | −1.75 | X |  |  | X |  |
| Neutral | 0 |  |  |  |  |  |
| CVTUD | 2.38 |  | X |  |  | X |
| CVTOD | 0.42 |  | X |  |  | X |
| OD1 | 0.42 |  | X | X |  |  |
| OD2 | 0.31 |  | X |  | X |  |

Figure 10:
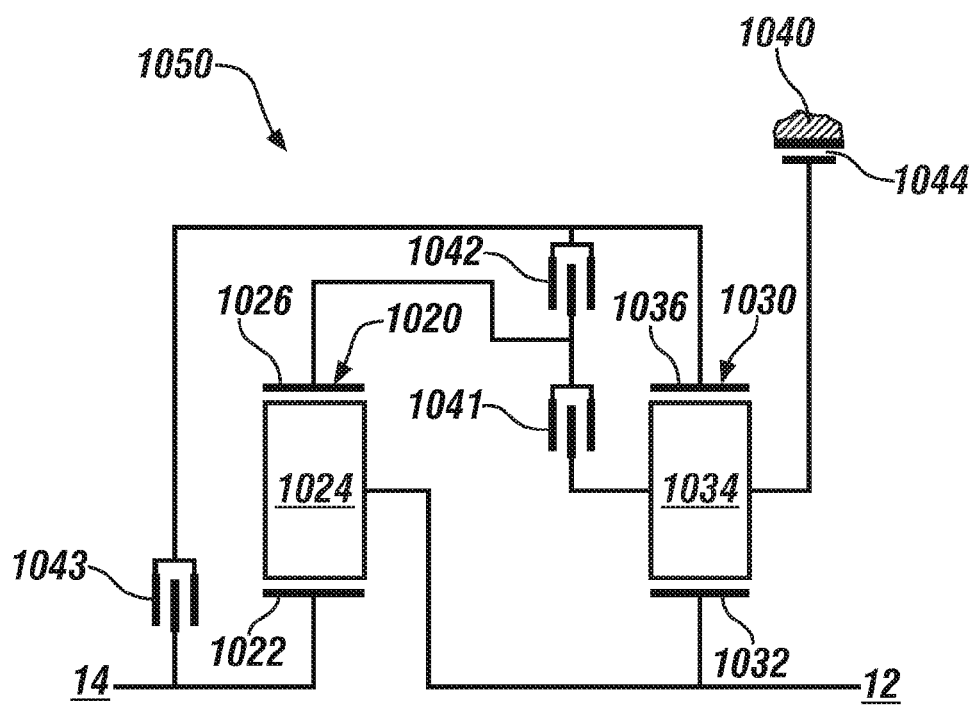

FIG. 10 schematically illustrates a ninth embodiment of the fixed-gear-ratio transmission 1050 that is capable of transferring mechanical power in either of a first overdrive (OD) state and a second OD state between the transmission input member 12 and the transmission output member 14. In this embodiment, the fixed-gear-ratio transmission 1050 includes a first planetary gear set 1020 and a second planetary gear set 1030. The first and second planetary gear sets 1020, 1030 are simple planetary gear sets. The first planetary gear set 1020 includes a first sun gear 1022, a first carrier 1024 and a first ring gear 1026, and the second planetary gear set 1030 includes a second sun gear 1032, a second carrier 1034 and a second ring gear 1036. The first sun gear 1022 couples to the output member 14 and selectively couples to the second ring gear 1036 by activating a third clutch 1043. The first carrier 1024 couples to the input member 12. The first ring gear 1026 selectively couples to the second ring gear 1036 by activating a second clutch C2 1042 and selectively couples to the second carrier 1034 by activating first clutch C1 1041. The second sun gear 1032 couples to the input member 12. The second carrier 1034 selectively grounds to the transmission case 1040 by activating a first brake B1 1044. In an alternative embodiment, brake B1 1044 can be replaced by a direct connection to the transmission case 1040. This is indicated in Table 9 by (X). In an embodiment of the multi-mode transmission 100 employing the ninth fixed-gear-ratio transmission 1050, a clutch activation chart and corresponding gear ratios associated with operation thereof is shown in Table 9. The stated gear ratios associated with operation of the CVU 40 include a maximum CVU underdrive ratio and a minimum CVU overdrive ratio. Table 9 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 9

|  | Ratios | B1 | C1 | C2 | C3 | Ccvt |
|---|---|---|---|---|---|---|
| Reverse | −1.8 | X |  |  | X |  |
| Neutral | 0 | (X) |  |  |  |  |
| CVTUD | 2.38 | X |  |  |  | X |
| CVTOD | 0.42 | X |  |  |  | X |
| OD1 | 0.42 | X | X |  |  |  |
| OD2 | 0.31 | X |  | X |  |  |

Figure 11:
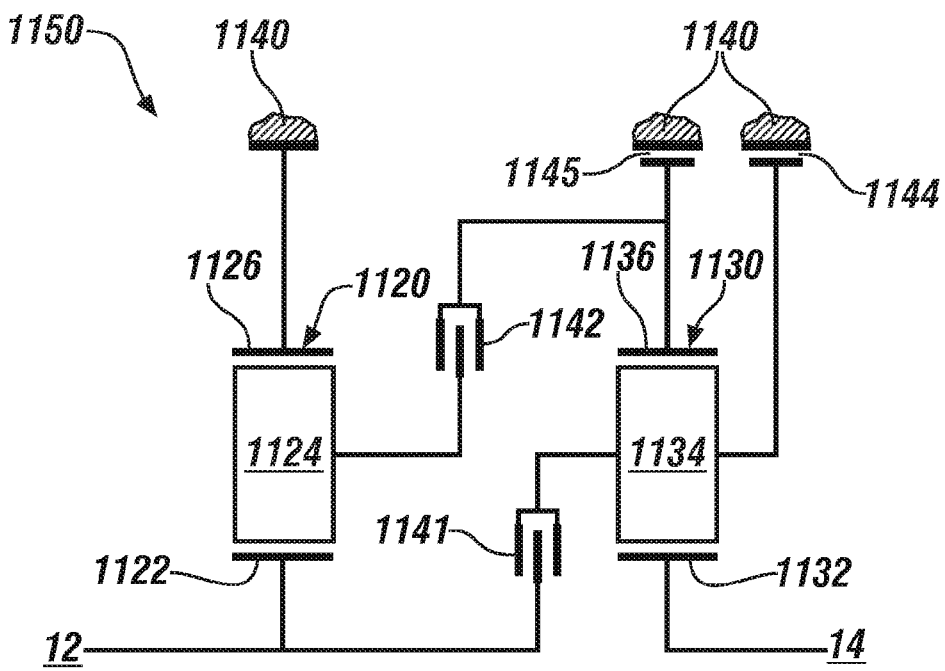

FIG. 11 schematically illustrates a tenth embodiment of the fixed-gear-ratio transmission 1150 that is capable of transferring mechanical power in either of a first overdrive (OD) state and a second OD state between the transmission input member 12 and the transmission output member 14. In this embodiment, the fixed-gear-ratio transmission 1150 includes a first planetary gear set 1120 and a second planetary gear set 1130. The first and second planetary gear sets 1120, 1130 are simple planetary gear sets. The first planetary gear set 1120 includes a first sun gear 1122, a first carrier 1124 and a first ring gear 1126, and the second planetary gear set 1130 includes a second sun gear 1132, a second carrier 1134 and a second ring gear 1136. The first sun gear 1122 couples to the input member 12 and selectively couples to the second carrier 1134 by activating a first clutch C1 1141. The first carrier 1124 selectively grounds to a transmission case 1140 by activating a second clutch C2 1142 and a second brake B2 1145, and selectively couples to the second ring gear 1136 by activating the second clutch C2 1142. The first ring gear 1126 grounds to the transmission case 1140. The second ring gear 1136 selectively couples to the transmission case 1140 by activating second brake B2 1145. The second sun gear 1132 couples to the output member 14. The second carrier 1134 selectively grounds to the transmission case 1140 by activating a first brake B1 1144. In an embodiment of the multi-mode transmission 100 employing the tenth fixed-gear-ratio transmission 1150, a clutch activation chart and corresponding gear ratios associated with operation thereof is shown in Table 10. The stated gear ratios associated with operation of the CVU 40 include a maximum CVU underdrive ratio and a minimum CVU overdrive ratio. Table 10 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 10

|  | Ratios | B1 | B2 | C1 | C2 | Ccvt |
|---|---|---|---|---|---|---|
| Reverse | −1.5 | X |  |  | X |  |
| Neutral | 0 |  |  |  | (X) |  |
| CVTUD | 2.33 |  |  |  | X | X |
| CVTOD | 0.43 |  |  |  | X | X |
| OD1 | 0.43 |  |  | X | X |  |
| OD2 | 0.33 |  | X | X |  |  |

Figure 12:
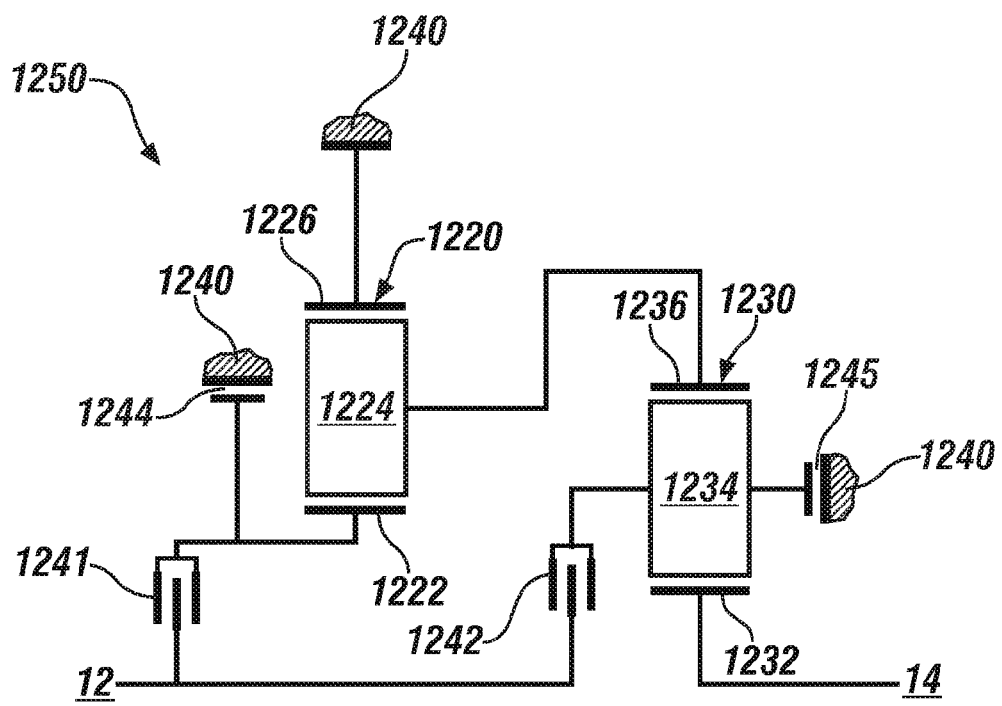

FIG. 12 schematically illustrates an eleventh embodiment of the fixed-gear-ratio transmission 1250 that is capable of transferring mechanical power in either of a first overdrive (OD) state and a second OD state between the transmission input member 12 and the transmission output member 14. In this embodiment, the fixed-gear-ratio transmission 1250 includes a first planetary gear set 1220 and a second planetary gear set 1230. The first and second planetary gear sets 1220, 1230 are simple planetary gear sets. The first planetary gear set 1220 includes a first sun gear 1222, a first carrier 1224 and a first ring gear 1226, and the second planetary gear set 1230 includes a second sun gear 1232, a second carrier 1234 and a second ring gear 1236. The first sun gear 1222 selectively grounds to a transmission case 1240 by activating a first brake B1 1244 and selectively couples to the input member 12 by activating a first clutch C1 1241. The first carrier 1224 couples to the second ring gear 1236. The first ring gear 1226 grounds to the transmission case 1240. The second sun gear 1232 couples to the output member 14. The second carrier 1234 selectively grounds to the transmission case 1240 by activating a second brake B2 1245 and selectively couples to the input member 12 by activating a second clutch C2 1242. In an embodiment of the multi-mode transmission 100 employing the fixed-gear-ratio transmission 1250, a clutch activation chart and corresponding gear ratios associated with operation thereof is shown in Table 11. The stated gear ratios associated with operation of the CVU 40 include a maximum CVU underdrive ratio and a minimum CVU overdrive ratio. Table 11 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 11

|  | Ratios | C1 | C2 | B1 | B2 | Ccvt |
|---|---|---|---|---|---|---|
| Reverse | −2.22 | X |  |  | X |  |
| Neutral | 0 | (X) |  |  |  |  |
| CVTUD | 2.35 | X |  |  |  | X |
| CVTOD | 0.425 | X |  |  |  | X |
| OD1 | 0.425 | X | X |  |  |  |
| OD2 | 0.357 |  | X | X |  |  |

Figure 13:
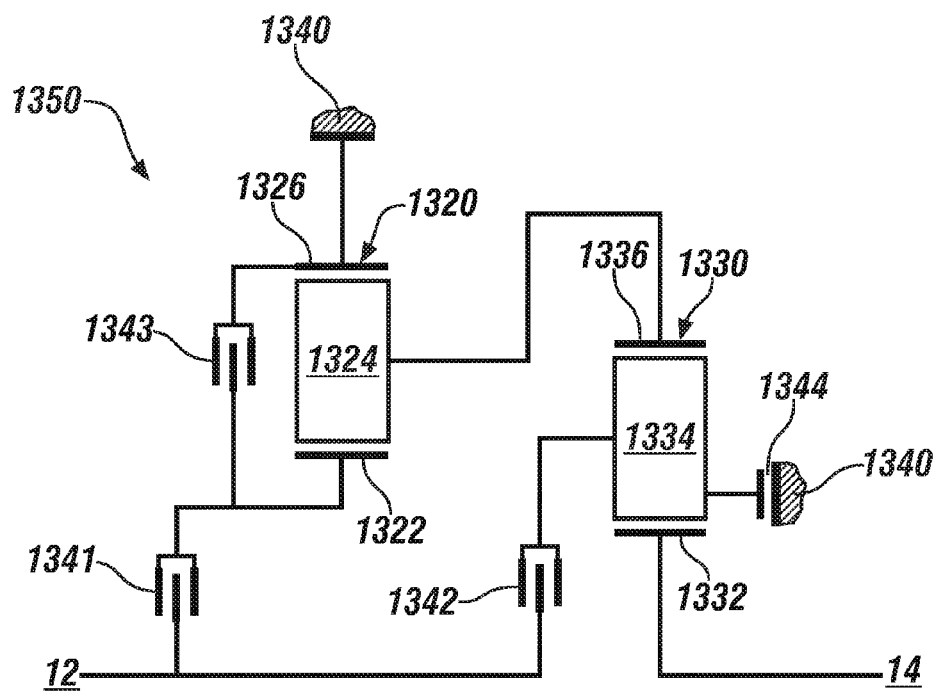

FIG. 13 schematically illustrates a twelfth embodiment of the fixed-gear-ratio transmission 1350 that is capable of transferring mechanical power in either of a first overdrive (OD) state and a second OD state between the transmission input member 12 and the transmission output member 14. In this embodiment, the fixed-gear-ratio transmission 1350 includes a first planetary gear set 1320 and a second planetary gear set 1330. The first and second planetary gear sets 1320, 1330 are simple planetary gear sets. The first planetary gear set 1320 includes a first sun gear 1322, a first carrier 1324 and a first ring gear 1326, and the second planetary gear set 1330 includes a second sun gear 1332, a second carrier 1334 and a second ring gear 1336. The first sun gear 1322 selectively couples to the input member 12 by activating a first clutch C1 1341 and selectively couples to the first ring gear 1326 by activating a third clutch C3 1343, which grounds to the transmission case 1340. The first carrier 1324 couples to the second ring gear 1336. The second sun gear 1332 couples to the output member 14. The second carrier 1334 selectively grounds to the transmission case 1340 by activating a first brake 1344, and selectively couples to the input member 12 by activating a second clutch C2 1342. In an embodiment of the multi-mode transmission 100 employing the fixed-gear-ratio transmission 1350, a clutch activation chart and corresponding gear ratios associated with operation thereof is shown in Table 12. The stated gear ratios associated with operation of the CVU 40 include a maximum CVU underdrive ratio and a minimum CVU overdrive ratio. Table 12 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 12

|  | Ratios | C1 | C2 | B1 | C3 | Ccvt |
|---|---|---|---|---|---|---|
| Reverse | −2.22 | X |  | X |  |  |
| Neutral | 0 | (X) |  |  |  |  |
| CVTUD | 2.35 | X |  |  |  | X |
| CVTOD | 0.425 | X |  |  |  | X |
| OD1 | 0.425 | X | X |  |  |  |
| OD2 | 0.357 |  | X |  | X |  |

Figure 14:
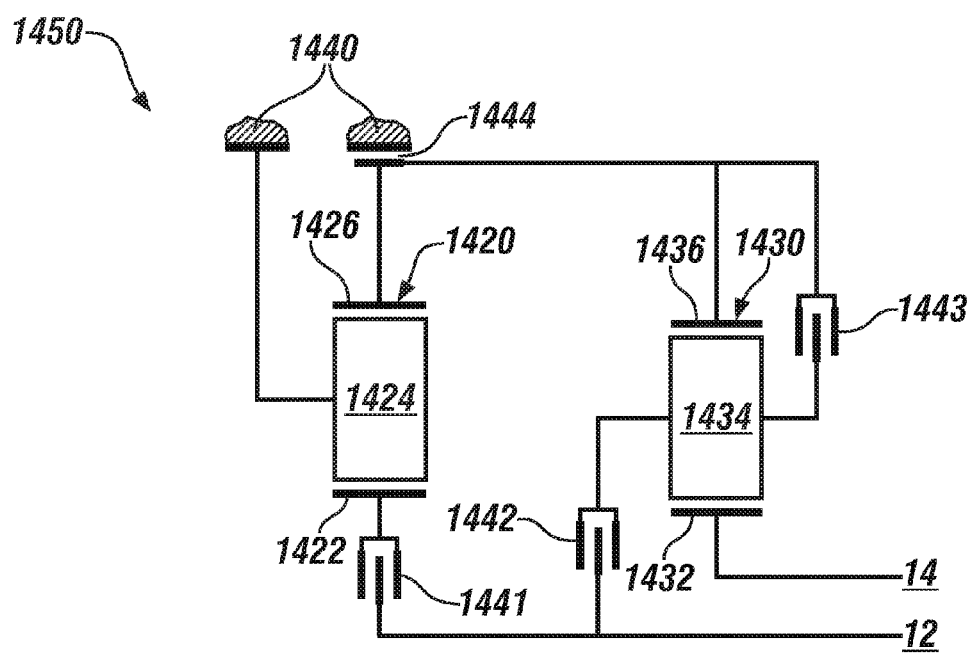

FIG. 14 schematically illustrates a thirteenth embodiment of the fixed-gear-ratio transmission 1450 that is capable of transferring mechanical power in either of a first overdrive (OD) state and a second OD state between the transmission input member 12 and the transmission output member 14. In this embodiment, the fixed-gear-ratio transmission 1450 includes a first planetary gear set 1420 and a second planetary gear set 1430. The first and second planetary gear sets 1420, 1430 are simple planetary gear sets. The first planetary gear set 1420 includes a first sun gear 1422, a first carrier 1424 and a first ring gear 1426, and the second planetary gear set 1430 includes a second sun gear 1432, a second carrier 1434 and a second ring gear 1436. The first sun gear 1422 selectively couples to the input member 12 by activating a first clutch C1 1441 and selectively couples to the second carrier 1434 by activating the first clutch C1 1441 and a second clutch C2 1442. The first carrier 1424 grounds to a transmission case 1440. The first ring gear 1426 couples to the second ring gear 1436 and selectively couples to the second carrier 1434 by activating a third clutch C3 1443. The first ring gear 1426 and the second ring gear 1436 selectively ground to the transmission case 1440 by activating a first brake B1 1444. The second sun gear 1432 connects to the output member 14. In an embodiment of the multi-mode transmission 100 employing the fixed-gear-ratio transmission 1450, a clutch activation chart and corresponding gear ratios associated with operation thereof is shown in Table 13. The stated gear ratios associated with operation of the CVU 40 include a maximum CVU underdrive ratio and a minimum CVU overdrive ratio. Table 13 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 13

|  | Ratios | C1 | C2 | B1 | C3 | Ccvt |
|---|---|---|---|---|---|---|
| Reverse | −2.2 | X |  |  | X |  |
| Neutral | 0 |  |  |  |  |  |
| CVTUD | 2.4 |  |  | X |  | X |
| CVTOD | 0.417 |  |  | X |  | X |
| OD1 | 0.417 |  | X | X |  |  |
| OD2 | 0.329 | X | X |  |  |  |

Figure 15:
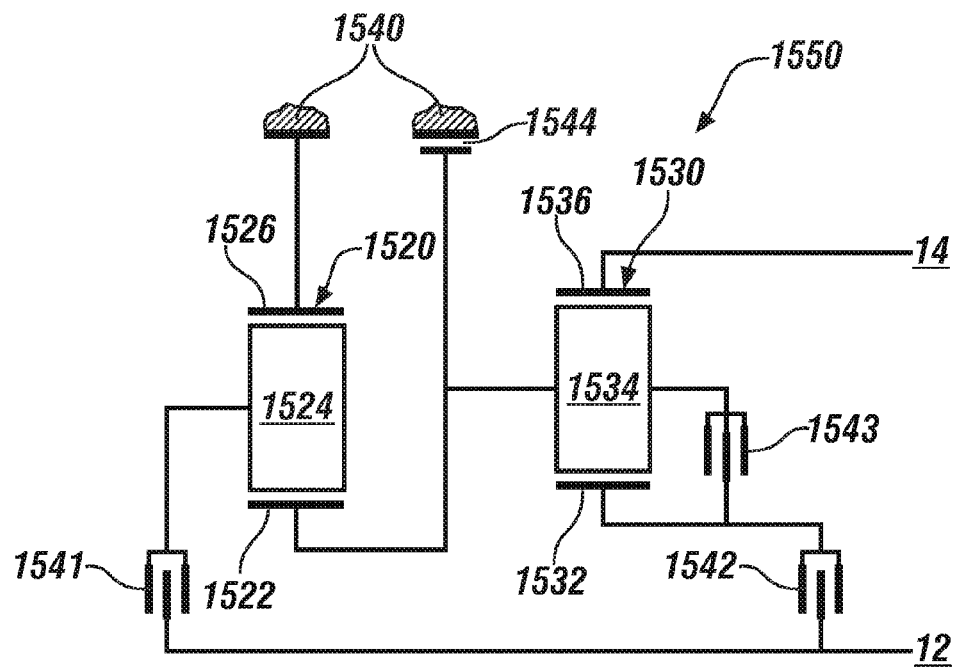

FIG. 15 schematically illustrates another embodiment of the fixed-gear-ratio transmission 1550 that is capable of transferring mechanical power in either of a first overdrive (OD) state and a second OD state between the transmission input member 12 and the transmission output member 14. In this embodiment, the fixed-gear-ratio transmission 1550 includes a first planetary gear set 1520 and a second planetary gear set 1530. The first and second planetary gear sets 1520, 1530 are simple planetary gear sets. The first planetary gear set 1520 includes a first sun gear 1522, a first carrier 1524 and a first ring gear 1526, and the second planetary gear set 1530 includes a second sun gear 1532, a second carrier 1534 and a second ring gear 1536. The first sun gear 1522 selectively grounds to a transmission case 1540 by activating a first brake B1 1544 and couples to the second carrier 1534. The first carrier 1524 selectively couples to the input member 12 by activating a first clutch C1 1541. The first ring gear 1526 couples to the transmission case 1540. The second sun gear 1532 selectively couples to the input member 12 by activating a second clutch C2 1542. The second carrier 1534 selectively couples to the second sun gear 1532 by activating a third clutch C3 1543. The second ring gear 1536 couples to the output member 14. In an embodiment of the multi-mode transmission 100 employing the fixed-gear-ratio transmission 1550, a clutch activation chart and corresponding gear ratios associated with operation thereof is shown in Table 14. The stated gear ratios associated with operation of the CVU 40 include a maximum CVU underdrive ratio and a minimum CVU overdrive ratio. Table 14 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 14

|  | Ratios | C1 | C2 | B1 | C3 | Ccvt |
|---|---|---|---|---|---|---|
| Reverse | −2.2 |  | X | X |  |  |
| Neutral | 0 |  |  |  |  |  |
| CVTUD | 2.4 | X |  |  |  | X |
| CVTOD | 0.417 | X |  |  |  | X |
| OD1 | 0.417 | X |  |  | X |  |
| OD2 | 0.329 | X | X |  |  |  |

Figure 16:
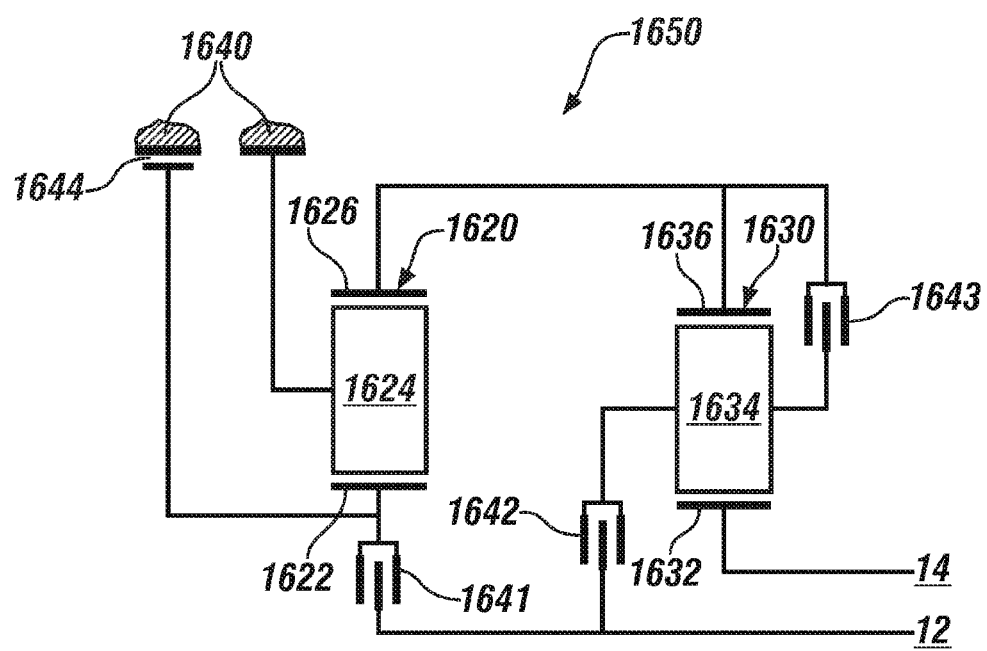

FIG. 16 schematically illustrates another embodiment of the fixed-gear-ratio transmission 1650 that is capable of transferring mechanical power in either of a first overdrive (OD) state and a second OD state between the transmission input member 12 and the transmission output member 14. In this embodiment, the fixed-gear-ratio transmission 1650 includes a first planetary gear set 1620 and a second planetary gear set 1630. The first and second planetary gear sets 1620, 1630 are simple planetary gear sets. The first planetary gear set 1620 includes a first sun gear 1622, a first carrier 1624 and a first ring gear 1626, and the second planetary gear set 1630 includes a second sun gear 1632, a second carrier 1634 and a second ring gear 1636. The first sun gear 1622 selectively grounds to a transmission case 1640 by activating a first brake B1 1644 and selectively couples to the input member 12 by activating a first clutch C1 1641. The first carrier 1624 grounds to the transmission case 1640. The first ring gear 1626 couples to the second ring gear 1636, and both selectively couple to second carrier 1634 by activating a third clutch C3 1643. The second sun gear 1632 couples to the output member 14, and the second carrier 1634 selectively couples to the input member 12 by activating a second clutch C2 1642. In an embodiment of the multi-mode transmission 100 employing the fixed-gear-ratio transmission 1650, a clutch activation chart and corresponding gear ratios associated with operation thereof is shown in Table 15. The stated gear ratios associated with operation of the CVU 40 include a maximum CVU underdrive ratio and a minimum CVU overdrive ratio. Table 15 shows clutch and/or brake activation (X) for the various modes including include Reverse, Neutral, CVU underdrive (CVTUD), CVU overdrive (CVTOD), first fixed-gear-ratio overdrive (OD1) and second fixed-gear-ratio overdrive (OD2), as follows.

TABLE 15

|  | Ratios | C1 | C2 | B1 | C3 | Ccvt |
|---|---|---|---|---|---|---|
| Reverse | −2.2 | X |  |  | X |  |
| Neutral | 0 |  |  |  |  |  |
| CVTUD | 2.4 |  |  | X |  | X |
| CVTOD | 0.417 |  |  | X |  | X |
| OD1 | 0.417 |  | X | X |  |  |
| OD2 | 0.329 | X | X |  |  |  |

Figure 17:
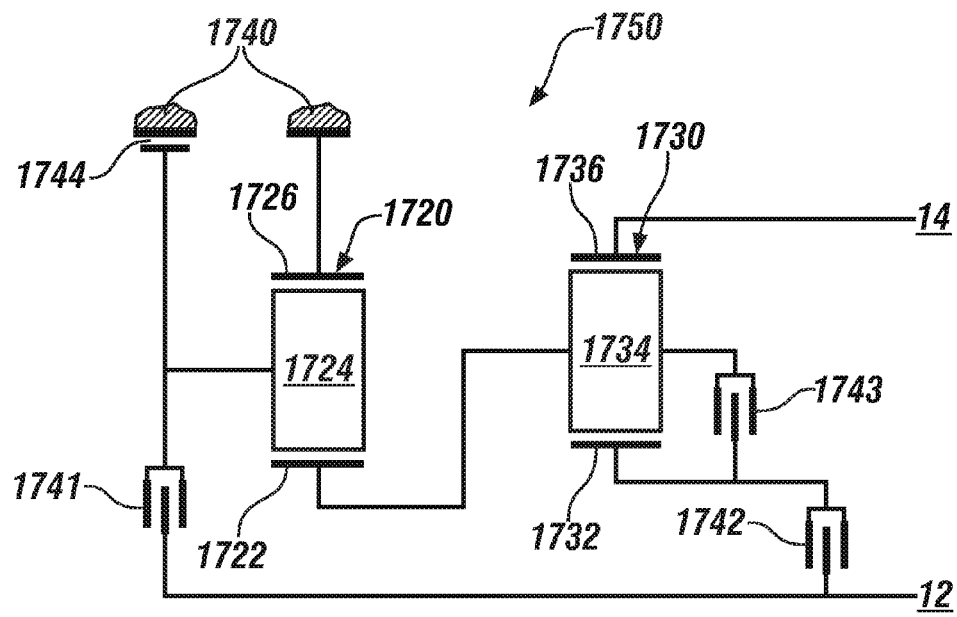

FIG. 17 schematically illustrates another embodiment of the fixed-gear-ratio transmission 1750 that is capable of transferring mechanical power in either of a first overdrive (OD) state and a second OD state between the transmission input member 12 and the transmission output member 14. In this embodiment, the fixed-gear-ratio transmission 1750 includes a first planetary gear set 1720 and a second planetary gear set 1730. The first and second planetary gear sets 1720, 1730 are simple planetary gear sets. The first planetary gear set 1720 includes a first sun gear 1722, a first carrier 1724 and a first ring gear 1726, and the second planetary gear set 1730 includes a second sun gear 1732, a second carrier 1734 and a second ring gear 1736. The first sun gear 1722 couples to the second carrier 1734. The first carrier 1724 selectively couples to the input member 12 by activating a first clutch C1 1741, and selectively grounds to the transmission case 1740 by activating a first brake B1 1744. The first ring gear 1726 grounds to the transmission case 1740. The second sun gear 1732 selectively couples to the input member 12 by activating a second clutch C2 1742. The second carrier 1734 selectively couples to the second sun gear 1732 by activating a third clutch C3 1743. The second ring gear 1736 couples to the output member 14. In an embodiment of the multi-mode transmission 100 employing the fixed-gear-ratio transmission 1750, a clutch activation chart and corresponding gear ratios associated with operation thereof is shown in Table 16. The stated gear ratios associated with operation of the CVU 40 include a maximum CVU underdrive ratio and a minimum CVU overdrive ratio. Table 16 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 16

|  | Ratios | C1 | C2 | B1 | C3 | Ccvt |
|---|---|---|---|---|---|---|
| Reverse | −2.2 |  | X | X |  |  |
| Neutral | 0 |  |  |  |  |  |
| CVTUD | 2.4 | X |  |  |  | X |
| CVTOD | 0.417 | X |  |  |  | X |
| OD1 | 0.417 | X |  |  | X |  |
| OD2 | 0.329 | X | X |  |  |  |

Figure 18:
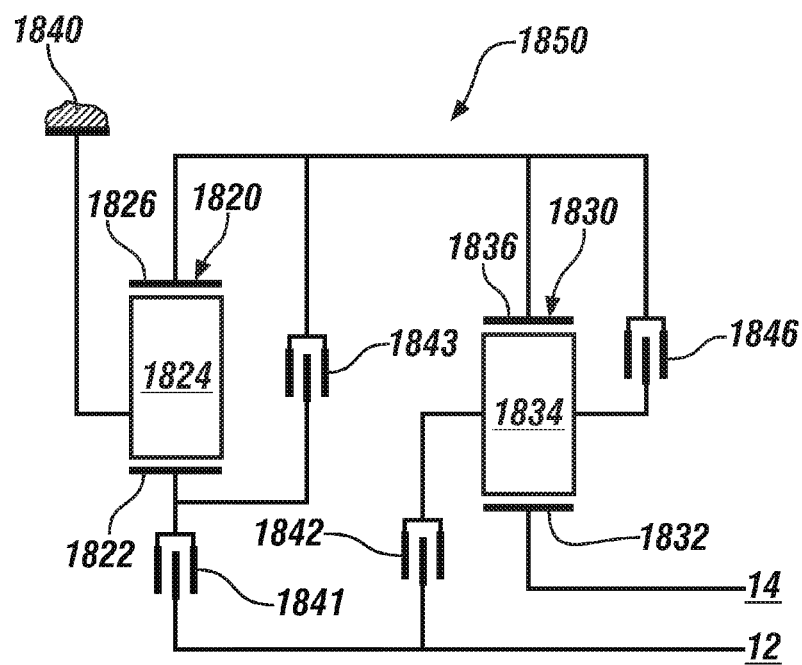

FIG. 18 schematically illustrates another embodiment of the fixed-gear-ratio transmission 1850 that is capable of transferring mechanical power in either of a first overdrive (OD) state and a second OD state between the transmission input member 12 and the transmission output member 14. In this embodiment, the fixed-gear-ratio transmission 1850 includes a first planetary gear set 1820 and a second planetary gear set 1830. The first and second planetary gear sets 1820, 1830 are simple planetary gear sets. The first planetary gear set 1820 includes a first sun gear 1822, a first carrier 1824 and a first ring gear 1826, and the second planetary gear set 1830 includes a second sun gear 1832, a second carrier 1834 and a second ring gear 1836. The first sun gear 1822 selectively couples to the input member 12 by activating a first clutch C1 1841, and selectively couples to the second ring gear 1836 by activating a third clutch C3 1843. The first carrier 1824 grounds to a transmission case 1840. The first ring gear 1826 couples to the second ring gear 1836 and both selectively couple to the second carrier 1834 by activating a fourth clutch C4 1846. The second sun gear 1832 couples to the output member 14. The second carrier 1834 selectively couples to the input member 12 by activating a second clutch C2 1842. In an embodiment of the multi-mode transmission 100 employing the fixed-gear-ratio transmission 1850, a clutch activation chart and corresponding gear ratios associated with operation thereof is shown in Table 17. The stated gear ratios associated with operation of the CVU 40 include a maximum CVU underdrive ratio and a minimum CVU overdrive ratio. Table 17 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 17

|  | Ratios | C1 | C2 | C3 | C4 | Ccvt |
|---|---|---|---|---|---|---|
| Reverse | −2.2 | X |  |  | X |  |
| Neutral | 0 |  |  |  |  |  |
| CVTUD | 2.4 |  | X |  |  | X |
| CVTOD | 0.417 |  | X |  |  | X |
| OD1 | 0.417 |  | X | X |  |  |
| OD2 | 0.329 | X | X |  |  |  |

Figure 19:
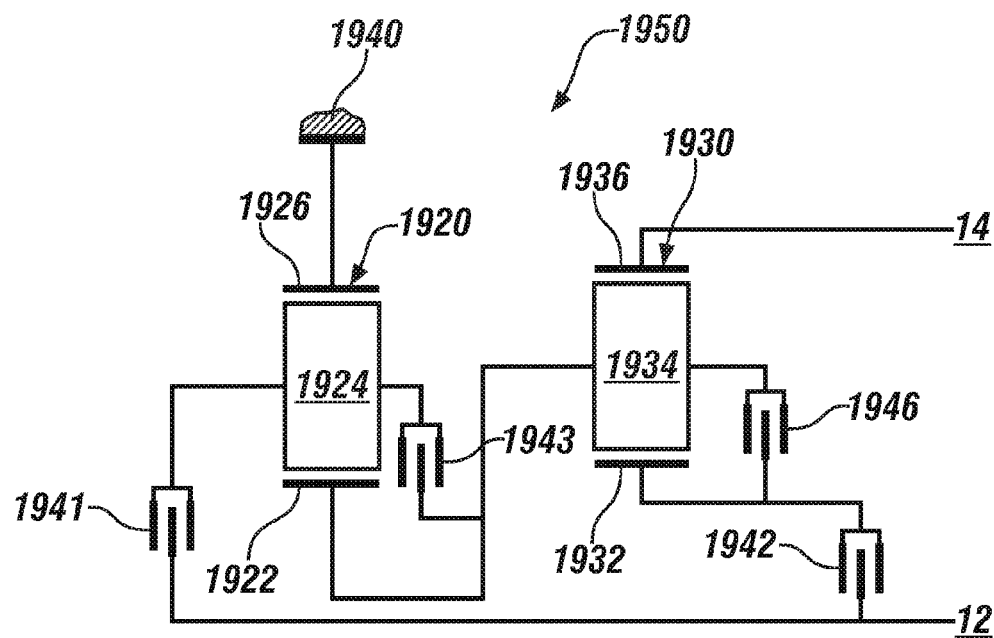

FIG. 19 schematically illustrates another embodiment of the fixed-gear-ratio transmission 1950 that is capable of transferring mechanical power in either of a first overdrive (OD) state and a second OD state between the transmission input member 12 and the transmission output member 14. In this embodiment, the fixed-gear-ratio transmission 1950 includes a first planetary gear set 1920 and a second planetary gear set 1930. The first and second planetary gear sets 1920, 1930 are simple planetary gear sets. The first planetary gear set 1920 includes a first sun gear 1922, a first carrier 1924 and a first ring gear 1926, and the second planetary gear set 1930 includes a second sun gear 1932, a second carrier 1934 and a second ring gear 1936. The first sun gear 1922 selectively couples to the first carrier 1924 by activating a third clutch C3 1943 and couples to the second carrier 1934. The first carrier selectively couples to the input member 12 by activating a first clutch C1 1941. The first ring gear 1926 couples to the transmission case 1940. The second sun gear 1932 selectively couples to the input member 12 by activating a second clutch C2 1942. The second carrier 1934 selectively couples to the input member 12 by activating the second clutch C2 1942 and fourth clutch C4 1946. The second carrier 1934 selectively couples to the second sun gear 1932 by activating the fourth clutch C4 1946. The second ring gear 1936 couples to the output member 14. In an embodiment of the multi-mode transmission 100 employing the fixed-gear-ratio transmission 1950, a clutch activation chart and corresponding gear ratios associated with operation thereof is shown in Table 18. The stated gear ratios associated with operation of the CVU 40 include a maximum CVU underdrive ratio and a minimum CVU overdrive ratio. Table 18 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 18

|  | Ratios | C1 | C2 | C3 | C4 | Ccvt |
|---|---|---|---|---|---|---|
| Reverse | −2.2 |  | X | X |  |  |
| Neutral | 0 |  |  |  |  |  |
| CVTUD | 2.4 | X |  |  |  | X |
| CVTOD | 0.417 | X |  |  |  | X |
| OD1 | 0.417 | X |  |  | X |  |
| OD2 | 0.329 | X | X |  |  |  |

Figure 20:
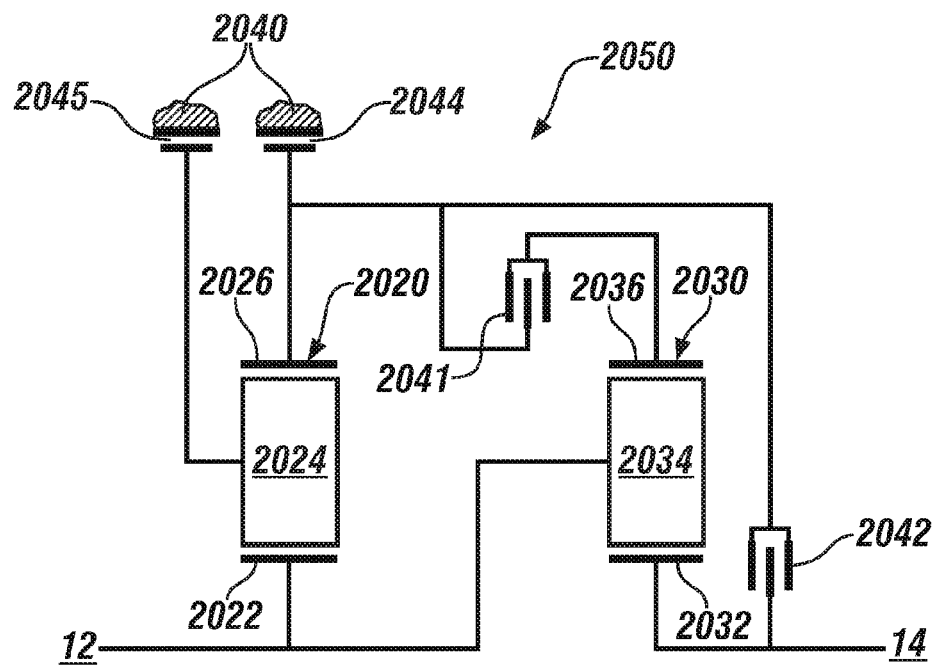

FIG. 20 schematically illustrates another embodiment of the fixed-gear-ratio transmission 2050 that is capable of transferring mechanical power in either of a first overdrive (OD) state and a second OD state between the transmission input member 12 and the transmission output member 14. In this embodiment, the fixed-gear-ratio transmission 2050 includes a first planetary gear set 2020 and a second planetary gear set 2030. The first and second planetary gear sets 2020, 2030 are simple planetary gear sets. The first planetary gear set 2020 includes a first sun gear 2022, a first carrier 2024 and a first ring gear 2026, and the second planetary gear set 2030 includes a second sun gear 2032, a second carrier 2034 and a second ring gear 2036. The first sun gear 2022 couples to the input member 12 and the second carrier 2034. The first carrier 2024 selectively brakes to the transmission case 2040 by activating a second brake B2 2045. The first ring gear 2026 selectively grounds to the transmission case 2040 by activating a first brake B1 2044, and selectively couples to the second ring gear 2036 by activating a first clutch C1 2041, and selectively couples to the output member 14 by activating a second clutch C2 2042. The second sun gear 2032 couples to the output member 14. In an embodiment of the multi-mode transmission 100 employing the fixed-gear-ratio transmission 2050, a clutch activation chart and corresponding gear ratios associated with operation thereof is shown in Table 19. The stated gear ratios associated with operation of the CVU 40 include a maximum CVU underdrive ratio and a minimum CVU overdrive ratio. Table 19 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 19

|  | Ratios | B1 | B2 | C1 | C2 | Ccvt |
|---|---|---|---|---|---|---|
| Reverse | −1.8 |  | X |  | X |  |
| Neutral | 0 |  |  |  |  |  |
| CVTUD | 2.38 |  |  | X |  | X |
| CVTOD | 0.42 |  |  | X |  | X |
| OD1 | 0.42 | X |  | X |  |  |
| OD2 | 0.31 |  | X | X |  |  |

Figure 21:
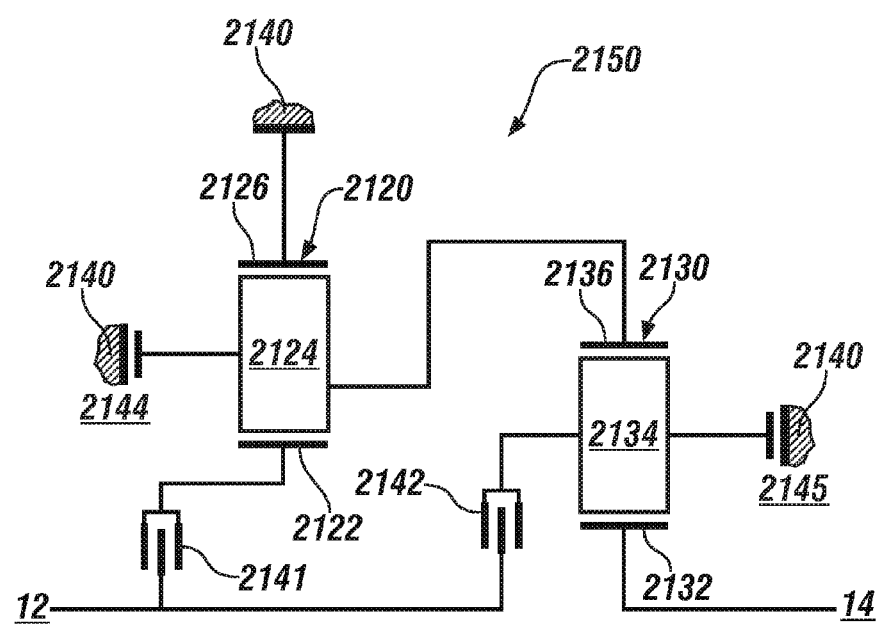

FIG. 21 schematically illustrates another embodiment of the fixed-gear-ratio transmission 2150 that is capable of transferring mechanical power in either of a first overdrive (OD) state and a second OD state between the transmission input member 12 and the transmission output member 14. In this embodiment, the fixed-gear-ratio transmission 2150 includes a first planetary gear set 2120 and a second planetary gear set 2130. The first and second planetary gear sets 2120, 2130 are simple planetary gear sets. The first planetary gear set 2120 includes a first sun gear 2122, a first carrier 2124 and a first ring gear 2126, and the second planetary gear set 2130 includes a second sun gear 2132, a second carrier 2134 and a second ring gear 2136. The first sun gear 2122 selectively couples to the input member 12 by activating a first clutch C1 2141. The first carrier 2124 selectively grounds to the transmission case 2140 by activating a first brake B1 2144 and couples to the second ring gear 2136. The first ring gear 2126 grounds to the transmission case 2140. The second carrier 2134 selectively couples to the input member 12 by activating a second clutch C2 2142 and selectively grounds to the transmission case 2140 by activating a second brake B2 2145. The second sun gear 2132 couples to the output member 14. In an embodiment of the multi-mode transmission 100 employing the fixed-gear-ratio transmission 2150, a clutch activation chart and corresponding gear ratios associated with operation thereof is shown in Table 20. The stated gear ratios associated with operation of the CVU 40 include a maximum CVU underdrive ratio and a minimum CVU overdrive ratio. Table 20 shows clutch and/or brake activation (X) for the various modes including Reverse, Neutral, CVU underdrive (CVTUD), CVU overdrive (CVTOD), first fixed-gear-ratio overdrive (OD1) and second fixed-gear-ratio overdrive (OD2), as follows.

TABLE 20

|  | Ratios | C1 | C2 | B1 | B2 | Ccvt |
|---|---|---|---|---|---|---|
| Reverse | −2.22 | X |  |  | X |  |
| Neutral | 0 |  |  |  |  |  |
| CVTUD | 2.35 | X |  |  |  | X |
| CVTOD | 0.425 | X |  |  |  | X |
| OD1 | 0.425 | X | X |  |  |  |
| OD2 | 0.357 |  | X | X |  |  |

The gains in transmission efficiency associated with the system described herein are manifested in terms of reduced pumping losses, reduced spin losses, reduced CVU belt losses and reduced final drive torque losses when operating in the fixed-gear-ratio mode.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A torque transmission device for a powertrain system, comprising:
   a continuously variable unit (CVU) arranged in parallel with a fixed-gear-ratio transmission to transfer torque between a transmission input member and a transmission output member;
   the transmission input member selectively rotatably coupled to an input member of the CVU by activating a CVU input clutch;

the transmission output member rotatably coupled to a CVU output member;

the fixed-gear-ratio transmission including first and second planetary gear sets and a plurality of transmission clutches, wherein the first and second planetary gear sets are arranged to transfer torque between the transmission input member and the transmission output member in one of first and second fixed-gear-ratio modes by selectively activating the transmission clutches;

the first and second planetary gear sets each including a plurality of meshingly engaged gear members including a ring gear, a plurality of planet gears coupled to a carrier and a sun gear;

the transmission input member rotatably coupled to one of the gear members of one of the first planetary gear set and the second planetary gear set and the transmission output member rotatably coupled to another of the gear members of one of the first planetary gear set and the second planetary gear set;

the torque transmission device operating in a continuously variable mode when the CVU input clutch is activated;

the torque transmission device operating in the first fixed-gear-ratio modes including a first fixed overdrive input/output speed ratio when the CVU input clutch is deactivated and a first set of two of the transmission clutches is activated; and the torque transmission device operating in the second fixed-gear-ratio modes including a second fixed overdrive input/output speed ratio when the CVU input clutch is deactivated and a second set of two of the transmission clutches is activated.

2. The torque transmission device of claim 1, further comprising one of the gear members of the first planetary gear set rotatably coupled to one of the gear members of the second planetary gear set when the torque transmission device operates in one of the first and second fixed-gear-ratio modes.

3. The torque transmission device of claim 1, further comprising the torque transmission device operating in a reverse mode at a fixed input/output speed ratio when the CVU input clutch is deactivated and a third set of two of the transmission clutches is activated.

4. The torque transmission device of claim 1, wherein the transmission input member rotatably coupled to one of the gear members of one of the first planetary gear set and the second planetary gear set and the transmission output member rotatably coupled to another of the gear members of one of the first planetary gear set and the second planetary gear set comprises the transmission input member rotatably coupled to the sun gear of the second planetary gear set and the transmission output member rotatably coupled to the ring gear of the second planetary gear set.

5. The torque transmission device of claim 1, wherein the transmission input member rotatably coupled to one of the gear members of one of the first planetary gear set and the second planetary gear set and the transmission output member rotatably coupled to another of the gear members of one of the first planetary gear set and the second planetary gear set comprises the transmission input member rotatably coupled to the sun gear of the first planetary gear set and the transmission output member rotatably coupled to the ring gear of the first planetary gear set.

6. The torque transmission device of claim 1, wherein the transmission input member rotatably coupled to one of the gear members of one of the first planetary gear set and the second planetary gear set comprises the transmission input member selectively rotatably coupled to one of the gear members via activation of one of the transmission clutches.

7. The torque transmission device of claim 1, wherein the transmission input member rotatably coupled to one of the gear members of one of the first planetary gear set and the second planetary gear set comprises the transmission input member fixedly rotatably coupled to one of the gear members.

8. The torque transmission device of claim 1, wherein the transmission output member rotatably coupled to another of the gear members of one of the first planetary gear set and the second planetary gear set comprises the transmission output member fixedly rotatably coupled to another of the gear members.

9. The torque transmission device of claim 1, further comprising the torque transmission device in a neutral state when all the transmission clutches and the CVU clutch are deactivated.

10. The torque transmission device of claim 1, further comprising the torque transmission device in a neutral state when all but one of the transmission clutches and the CVU clutch are deactivated.

11. The torque transmission device of claim 1, further comprising the torque transmission device operating in a continuously variable mode when the CVU input clutch and a single one of the plurality of transmission clutches are activated.

12. The torque transmission device of claim 1, wherein the torque transmission device operating in a continuously variable mode when the CVU input clutch is activated comprises the torque transmission device operating in a continuously variable mode within a range between a maximum CVU underdrive ratio and a minimum CVU overdrive ratio.

13. The torque transmission device of claim 12, wherein the minimum CVU overdrive ratio is equivalent to the first fixed overdrive input/output speed ratio to enable a synchronized shift when the CVU input clutch is deactivated and a first set of two of the transmission clutches is activated to operate the torque transmission device operating in the first of the fixed-gear-ratio modes.

14. The torque transmission device of claim 1, wherein the plurality of clutches includes at least one selectively activatable torque transfer device for rotatably coupling coaxial gear members of the first and second planetary gear sets and at least one selectively activatable torque transfer device for grounding rotation of one of the gear members to a non-rotating element.

15. The torque transmission device of claim 14, wherein one of the at least one of the selectively activatable torque transfer devices for grounding rotation of one of the gear members to a non-rotating element comprises a direct connection to the non-rotating element.

16. A torque transmission device for a powertrain system, comprising:

a continuously variable unit (CVU) arranged in parallel with a fixed-gear-ratio transmission between a transmission input member and a transmission output member;

the transmission input member selectively rotatably coupled to an input member of the CVU via a CVU input clutch;

the transmission output member fixedly rotatably coupled to a CVU output member;

the fixed-gear-ratio transmission including first and second planetary gear sets and a plurality of transmission clutches, wherein the first and second planetary gear sets are arranged to transfer torque between the transmission input member and the transmission output member in one of a first fixed-gear-ratio mode or a second fixed-gear-ratio mode by selectively activating the transmission clutches;

the first and second planetary gear sets each including a plurality of meshingly engaged gear members including a ring gear, a plurality of planet gears coupled to a carrier and a sun gear;

the transmission input member rotatably coupled to one of the gear members of one of the first planetary gear set and the second planetary gear set and the transmission output member fixedly rotatably coupled to another of the gear members of one of the first planetary gear set and the second planetary gear set;

the torque transmission device operating in the first fixed-gear-ratio mode when the CVU input clutch is deactivated and a first set of the transmission clutches is activated; and the torque transmission device operating in the second fixed-gear-ratio mode when the CVU input clutch is deactivated and a second set of the transmission clutches is activated.

17. The torque transmission device of claim 16, further comprising one of the gear members of the first planetary gear set rotatably coupled to one of the gear members of the second planetary gear set when the torque transmission device transfers torque in one of the first and second fixed-gear-ratio modes.

18. The torque transmission device of claim 16, further comprising the transmission input member rotatably coupled to one of the gear members of one of the first planetary gear set and the second planetary gear set.

19. The torque transmission device of claim 16, further comprising the torque transmission device transferring torque in a continuously variable mode when the CVU input clutch is activated within a range between a maximum CVU underdrive ratio and a minimum CVU overdrive ratio.

20. The torque transmission device of claim 19, wherein the minimum CVU overdrive ratio is equivalent to the first fixed overdrive input/output speed ratio to enable a synchronized shift when the CVU input clutch is deactivated and a first set of two of the transmission clutches is activated to operate the torque transmission device in the first fixed-gear-ratio mode.

* * * * *